(12) United States Patent
Meyer (10) Patent No.: US 10,962,041 B2
(45) Date of Patent: Mar. 30, 2021

(54) FASTENING ARRANGEMENT (71) Applicants: Gerrit Pies, Solingen (DE); Wolfgang Rixen, Solingen (DE)

(72) Inventor: Torsten Meyer, Solingen (DE)

(73) Assignees: Gerrit Pies; Wolfgang Rixen

( * ) Notice: Subject to any disclaimer, the term of this patent is extended or adjusted under 35 U.S.C. 154(b) by 0 days.

(21) Appl. No.: 16/628,226

(22) PCT Filed: Jul. 2, 2018

(86) PCT No.: PCT/EP2018/067831
§ 371 (c)(1),
(2) Date: Jan. 2, 2020

(87) PCT Pub. No.: WO2019/007911
PCT Pub. Date: Jan. 10, 2019

(65) Prior Publication Data
US 2020/0392975 A1    Dec. 17, 2020

(30) Foreign Application Priority Data

Jul. 3, 2017 (DE) ..................... 10 2017 006 233.1

(51) Int. Cl.
*F16B 37/04* (2006.01)
*F16B 7/18* (2006.01)

(52) U.S. Cl.
CPC ............ *F16B 37/047* (2013.01); *F16B 7/187* (2013.01); *F16B 37/04* (2013.01); *F16B 37/044* (2013.01)

(58) Field of Classification Search
CPC .... F16B 4/004; F16B 7/04; F16B 7/18; F16B 7/187; F16B 35/06; F16B 37/04;
(Continued)

(56) References Cited

U.S. PATENT DOCUMENTS 2,682,322 A * 6/1954 Bloedow .................. E04B 1/40
403/345
4,488,844 A * 12/1984 Baubles ................ F16B 37/045
411/103
(Continued)

FOREIGN PATENT DOCUMENTS

DE    19959121 A1    6/2001
DE    20010915 U1    10/2001
(Continued)

OTHER PUBLICATIONS

English abstract for DE-19959121.

*Primary Examiner* — Roberta S Delisle
(74) *Attorney, Agent, or Firm* — Fishman Stewart PLLC (57) ABSTRACT

A fastening arrangement may include a first component having an undercut groove, and a second component having a through opening. The second component may be couplable on the first component via a fastening device configured to be guided through the through opening and engage the undercut groove. The fastening device may have an axis oriented perpendicularly to the undercut groove. The fastening device may include a hammer head element and a holding element. The hammer head element and the holding element coupled thereto may be rotatable about the axis in an unrestricted manner when mounted on the second component. The hammer head element may have a plurality of orienting contours configured to set an orientation of the hammer head element relative to the undercut groove such that the hammer head element is dippable into the undercut groove independently of a rotary position of the hammer head element about the axis.

20 Claims, 5 Drawing Sheets (58) Field of Classification Search
CPC .... F16B 37/044; F16B 37/045; F16B 37/047; Y10S 411/999; Y10T 403/75; B61G 7/12; B61G 9/24
USPC .............. 411/337, 339, 351; 403/345, 359.1
See application file for complete search history.

(56) References Cited

U.S. PATENT DOCUMENTS

| | | | |
|---|---|---|---|
| 8,746,646 B2* | 6/2014 | Fluhrer | F24S 25/30 |
| | | | 248/500 |
| 9,599,136 B2 | 3/2017 | Rixen et al. | |
| 10,662,650 B2* | 5/2020 | Lacroix | E04C 3/06 |
| 10,686,401 B2* | 6/2020 | Ash | H01R 4/305 |
| 2003/0091384 A1 | 5/2003 | Jo | |
| 2006/0078371 A1* | 4/2006 | Holscher | F16B 7/187 |
| | | | 403/264 |
| 2012/0045275 A1 | 2/2012 | Vollmer | |
| 2012/0193310 A1* | 8/2012 | Fluhrer | H02S 20/20 |
| | | | 211/41.1 |
| 2017/0085219 A1* | 3/2017 | Ash | H01R 4/305 |

FOREIGN PATENT DOCUMENTS

| | | |
|---|---|---|
| DE | 202010008312 U1 | 10/2010 |
| DE | 202012007790 U1 | 11/2012 |
| EP | 2885545 B1 | 9/2016 |
| WO | 0140668 A1 | 6/2001 |
| WO | 2016/200963 | 12/2016 |

* cited by examiner

FASTENING ARRANGEMENT

CROSS-REFERENCE TO RELATED APPLICATIONS

This application claims priority to International Patent Application No. PCT/EP2018/067831, filed on Jul. 2, 2018, and German Patent Application No. DE 10 2017 006 233.1, filed on Jul. 3, 2017, the contents of both of which are hereby incorporated by reference in their entireties.

TECHNICAL FIELD

The present invention relates to a fastening arrangement having a first component which has an undercut groove, and a second component which has a through opening. Moreover, the invention relates to a hammer head element of a fastening arrangement of this type, which hammer head element is configured as a hammer head nut or as a hammer head screw.

BACKGROUND

DE 20 2010 008 312 U1 has disclosed a fastening device which is configured as a hammer head screw, orienting contours being provided which have a plurality of orienting bevels which are oriented in a point-symmetrical manner with respect to the axis and generate an angular momentum.

EP 2 885 545 B1 has disclosed a fastening arrangement of the generic type having a first component which has an undercut groove, and having a second component which has a through opening, it being possible for the second component to be fixed on the first component via a fastening device which is guided through the through opening of said second component and engages substantially perpendicularly into the groove of said first component. Here, the known fastening device has a hammer head screw which has two small lugs at a first end of its shank, that is to say directly adjacently with respect to a head, which lugs protrude into corresponding jaws of a connecting element and thus bring about a rotary angle restriction. Moreover, the hammer head screw has a free-form head which brings it about that the hammer head screw rotates automatically in the groove direction.

In the case of known groove blocks, there is generally the problem that they first of all have to be moved into a predefined position with regard to the groove or profile groove, in order for it to be possible for them to be inserted there. There is the problem here even in the case of the hammer head screw which is known from EP 2 885 545 B1 that said screw has to be oriented in a predefined angular range of 45 degrees before being placed onto the groove, in order for it to be possible for the angular momentum which is required for the final orientation of the hammer head screw to be generated. Although this is slightly less complicated than in the case of a conventional groove block, the complicated orientation of the hammer head screw likewise cannot be dispensed with.

SUMMARY

The present invention is therefore concerned with the problem of specifying an improved or at least alternative embodiment for a fastening arrangement of the generic type, which embodiment overcomes, in particular, the disadvantages which are known from the prior art.

According to the invention, said problem is solved by way of the subject matter of the independent claim(s). Advantageous embodiments are the subject matter of the dependent claim(s).

The present invention is based on the general concept of bringing about for the first time a fastening device for fastening a first component which has an undercut groove to a second component which has a through opening by means of a hammer head element and a holding element which can be screwed to it, the hammer head element being configured in such a way that it can be rotated about its axis without problems by way of simple pressing onto the groove independently of its rotary angle position with respect to the groove, and therefore can be introduced into the groove. Here, the fastening arrangement according to the invention has a first component which has an undercut groove, for example a profile groove, and a second component which has a through opening. Here, the second component is fixed or can be fixed on the first component via the fastening device which is guided through the through opening of said second component and engages substantially perpendicularly into the groove. The fastening device therefore has an axis which, in the case of a mounted fastening device, is oriented substantially perpendicularly with respect to the groove. According to the invention, the fastening device then comprises the abovementioned hammer head element and the holding element which can be screwed to it. It is particularly advantageous here that the hammer head element and the holding element which is screwed to it can be rotated about the axis in an unrestricted manner in the state in which they are mounted on the second component, which is a considerable difference from the fastening arrangement which is known from DE 20 2012 007 790 U1, in the case of which the hammer head element was capable of being rotated only by a small angular range β with regard to the second component (fastening body). Here, the hammer head element has orienting contours on a side which faces the groove of the first component, which orienting contours are configured in such a way that, in the case of the orienting contours being pressed onto the groove, they bring about an orientation of the hammer head element with respect to the groove such that it can dip into it independently of their rotary position about the axis. A previous orientation of the hammer head element, as, for example, in the case of the hammer head screw which is known from the prior art, is therefore no longer required, as a result of which the fastening can be carried out in a considerably simpler, more rapid and therefore not only more comfortable, but also less expensive manner.

It is provided in one advantageous development of the invention that the hammer head element is configured as a hammer head nut which has an internal thread, and the holding element is configured as a screw which can be screwed into said hammer head nut, or that the hammer head element is configured as a hammer head screw, and the holding element is configured as a nut which can be screwed onto said hammer head screw. This makes it clear that it is irrelevant for the fastening arrangement according to the invention whether the hammer head element is a hammer head nut or a hammer head screw. In comparison with the fastening arrangements which are known from the prior art, it is therefore possible in the case of the fastening arrangement according to the invention having the fastening device in accordance with the first alternative to prepare said fastening arrangement by way of simple guiding of the screw through the through opening of the second component and at least slight screwing of the hammer head nut onto the screw, and to introduce it into the groove by way of simple pressing onto the groove of the first component with the hammer head nut. Subsequently, the hammer head nut which is introduced into the groove can be rotated by way of a rotation of the screw, until said hammer head nut rotates by approximately 90 degrees and is then supported on the two groove flanks via two corner regions which are configured as lugs and is prevented from rotating further. It goes without saying that it is also conceivable purely theoretically that the hammer head nut is supported during the rotation via other regions than the corner regions, for example in the undercut profile groove itself, and non-rotational fixing of the hammer head nut in the profile groove is brought about via this. This also functions analogously in the case of a hammer head element which is configured as a hammer head screw with a nut which is configured as a holding element.

In one advantageous development of the solution according to the invention, the orienting contours are formed integrally on the hammer head element. Here, in particular in the case of a hammer head element which is produced from plastic or from metal, the orienting contours can be produced simply together with the hammer head element in a plastic injection molding operation or a casting or stamping operation, as a result of which a corresponding negative mold has to be produced merely a single time. As a result, the hammer head element according to the invention can be produced inexpensively and at the same time with a high quality.

In a further advantageous embodiment of the solution according to the invention, the orienting contours are configured in a point-symmetrical manner with respect to the axis of the hammer head element and, moreover, can have a plurality of orienting bevels which are oriented in a point-symmetrical manner with respect to the axis and generate an angular momentum. Here, said orienting bevels or generally the orienting contours can preferably have a convex shape and, as a result, assist the angular momentum-generating effect during pressing of the hammer head element onto the groove or the groove flanks. It goes without saying that concave shapes of the orienting contours or orienting bevels are also conceivable.

At least two adjacent orienting contours or orienting bevels are expediently connected to one another via rounded burrs. Rounded burrs of this type prevent, in particular, tilting of the hammer head element during the introduction into the groove, and therefore facilitate the mounting of the fastening arrangement according to the invention.

It is advantageously provided that two burrs intersect the axis, whereas the remaining burrs do not intersect the axis. Said two burrs run from the respective corner region of the hammer head element which is configured as a hammer head nut toward the through opening which is formed by way of an internal thread. Here, the individual burrs meet at an edge of the through opening at two opposite points. By way of this, it can also be achieved that the hammer head element can be placed onto the groove in a manner which is completely independent of the rotary angle, and that said hammer head element orients itself by way of light pressure.

In a further advantageous embodiment of the solution according to the invention, a friction-increasing layer or structuring which brings about driving of the hammer head element in the case of a rotation of the holding element is provided at indirect or direct contact points between the hammer head element and the holding element. This can be brought about, for example, by way of a corresponding plastic insert in the internal thread of the hammer head element which is configured as a hammer head nut, which plastic insert is also used in a similar way in the case of self-locking nuts. As an alternative or in addition, it goes without saying that it is also conceivable that a friction-increasing layer or structuring of this type is arranged on the external thread of the holding element which is configured as a screw.

In a further advantageous embodiment of the solution according to the invention, on its side which faces away from the orienting contours, the hammer head element has an axial projection which, as viewed in an axial view, has two right-angled corner regions (also called lugs for short) which lie diagonally opposite one another. Said two lugs merge into one another via two arcuate regions which lie opposite one another, the two right-angled corner regions bearing in a rotationally restricting manner against corresponding groove flanks in a mounted state after the hammer head element has dipped completely into the groove, and permitting merely a rotation of the hammer head element by approximately 90 degrees in the groove or profile groove. Here, the axial projection and the arcuate regions or right-angled corner regions (lugs) which are arranged on it can likewise be configured integrally with the hammer head element and, as a result, can likewise in turn be produced inexpensively and at the same time with a high quality.

In one advantageous development of the solution according to the invention, the first component is configured as a profiled bar. Profiled bars of this type are used in many locations, for example in plant engineering and mechanical engineering, in exhibition stand construction, or else in scaffolding construction, for example for non-load-bearing walls. For the attachment of further components (here, the second component), it is therefore necessary to provide a fastening arrangement which can be mounted as simply as possible but at the same time provides reliable fixing. Here, it is also conceivable purely theoretically that the second component is also a profiled bar, with the result that two profiled bars of this type are provided, and the second component having two through openings, in which in each case one fastening device is arranged, with the result that a connection of two first components to one another is possible via a second component of this type which has two fastening devices.

The present invention is based, furthermore, on the general concept of specifying a hammer head element for the above-described fastening arrangement, which hammer head element is configured as a hammer head nut or as a hammer head screw and has orienting contours which have a plurality of orienting bevels which are oriented in a point-symmetrical manner with respect to the axis of the hammer head nut or the hammer head screw and generate an angular momentum. Here, a hammer head nut or hammer head screw of this type according to the invention can purely theoretically also be combined with commercially available screws or nuts in order to produce a fastening device which belongs to the fastening arrangement according to the invention.

Further important features and advantages of the invention result from the subclaims, from the drawings and from the associated description of the figures on the basis of the drawings.

It goes without saying that the features which are mentioned in the above text and which are still to be described in the following text can be used not only in the respective specified combination, but rather also in other combinations or on their own, without departing from the scope of the present invention.

Preferred exemplary embodiments of the invention are shown in the drawings and will be described in greater detail in the following description, identical designations denoting identical or similar or functionally identical components.

DETAILED DESCRIPTION

Figure 1A:
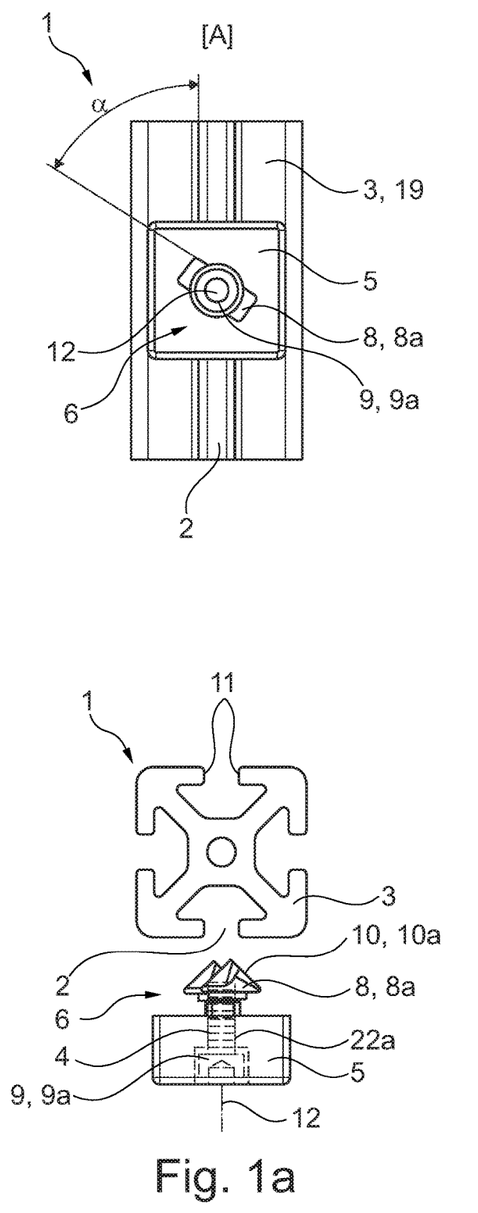
FIGS. 1a through 1e show individual method steps A-E for mounting a fastening arrangement according to the invention.
Figure 1B:
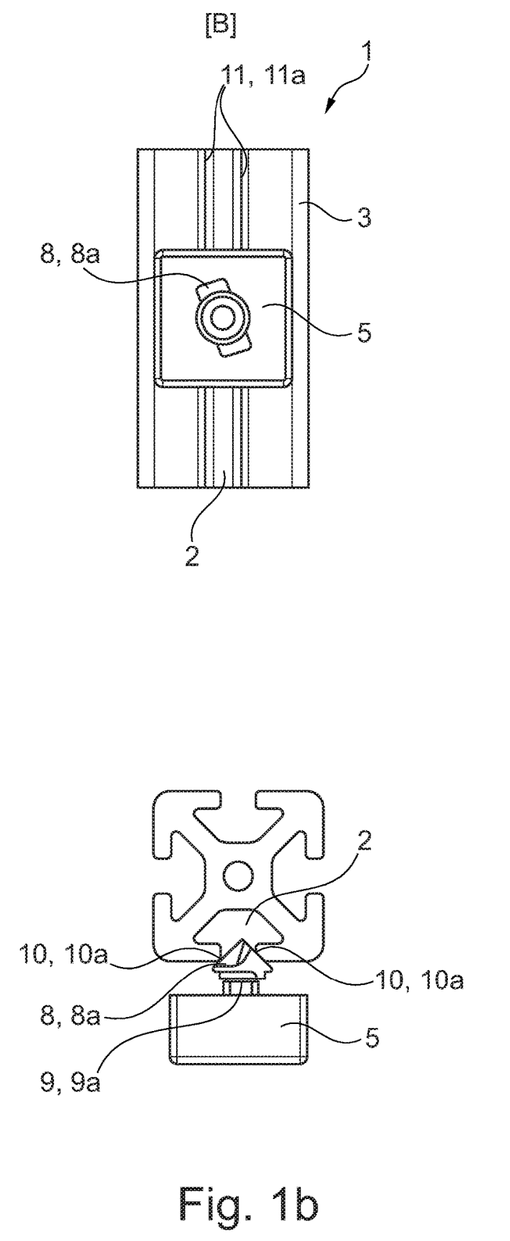
Figure 1C:
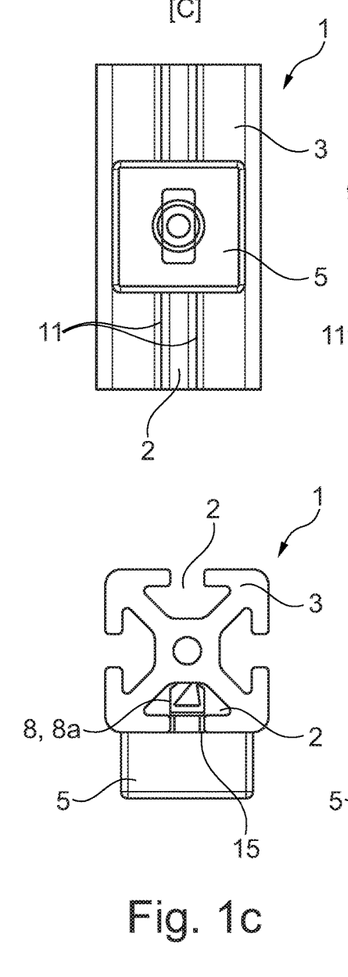
Figure 1D:
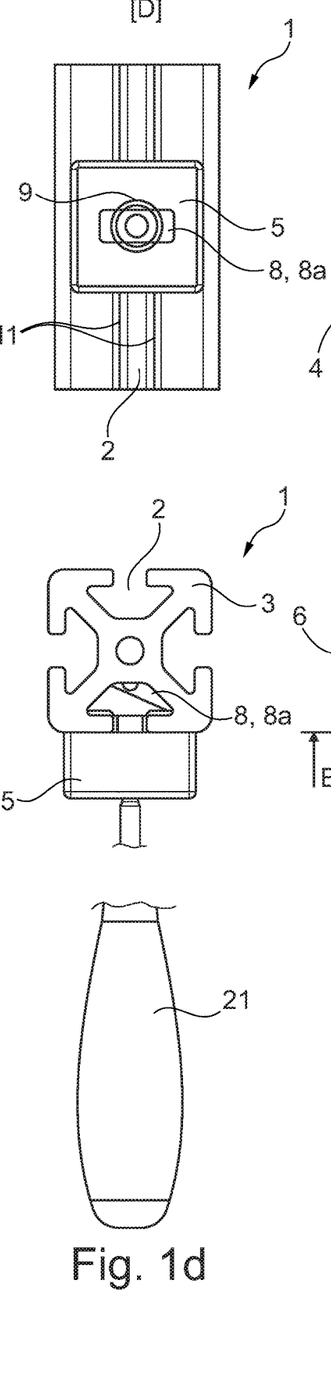
Figure 1E:
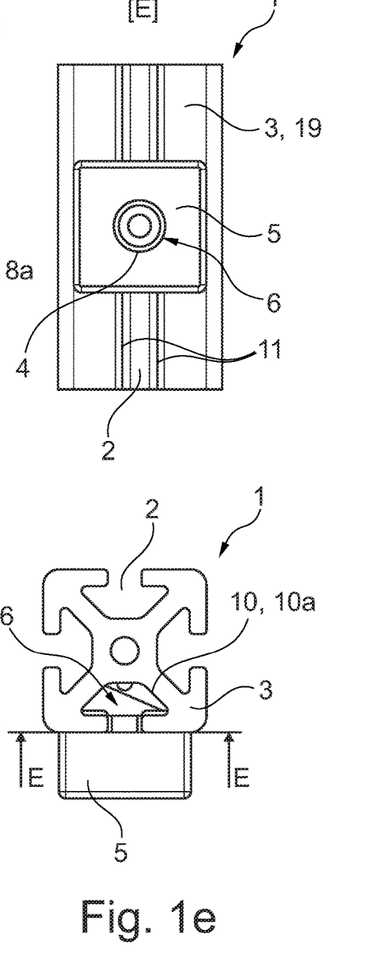
Figure 2:
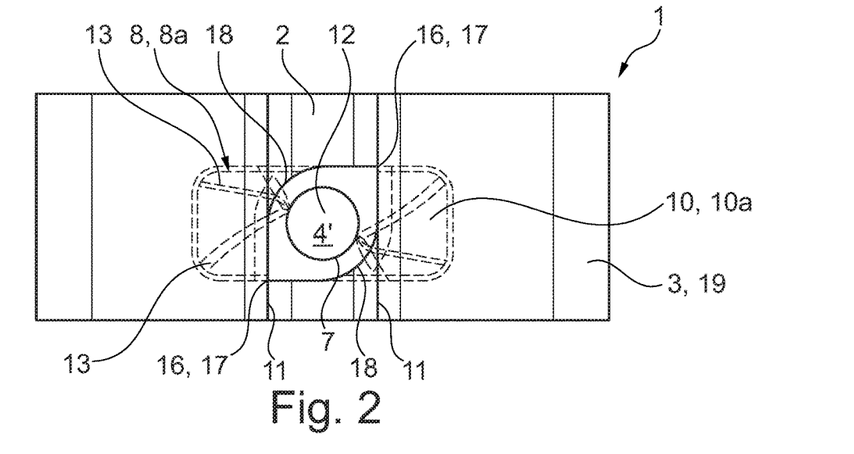
FIG. 2 shows a sectional illustration in accordance with the sectional plane E-E from FIG. 1e in the case of a tightened fastening arrangement.

In accordance with FIGS. 1 and 2, a fastening arrangement 1 according to the invention has a first component 3 which has an undercut groove 2, for example a profile groove, and a second component 5 which has a through opening 4. A fastening device 6 for fastening the second component 5 to the first component 3 is likewise provided. Here, the second component 5 is fixed on the first component 3 via the fastening device 6 which is guided through the through opening 4 of said second component 5 and engages substantially perpendicularly into the groove 2. According to the invention, the fastening device 6 then comprises a hammer head element 8 (cf. also FIGS. 3 to 7) and a holding element 9 which can be screwed to it. The hammer head element 8 and the holding element 9 which is screwed to it can be rotated about the axis 12 in an unrestricted manner in the state in which they are mounted on the second component 5, the hammer head element 8 having orienting contours 10 on a side which faces the groove 2, which orienting contours 10 are configured in such a way that, in the case of being pressed onto the groove 2, they set an orientation of the hammer head element 8 with respect to the groove 2 such that it can dip into it independently of the rotary position of the hammer head element 8 about the axis 12.

Figure 8:
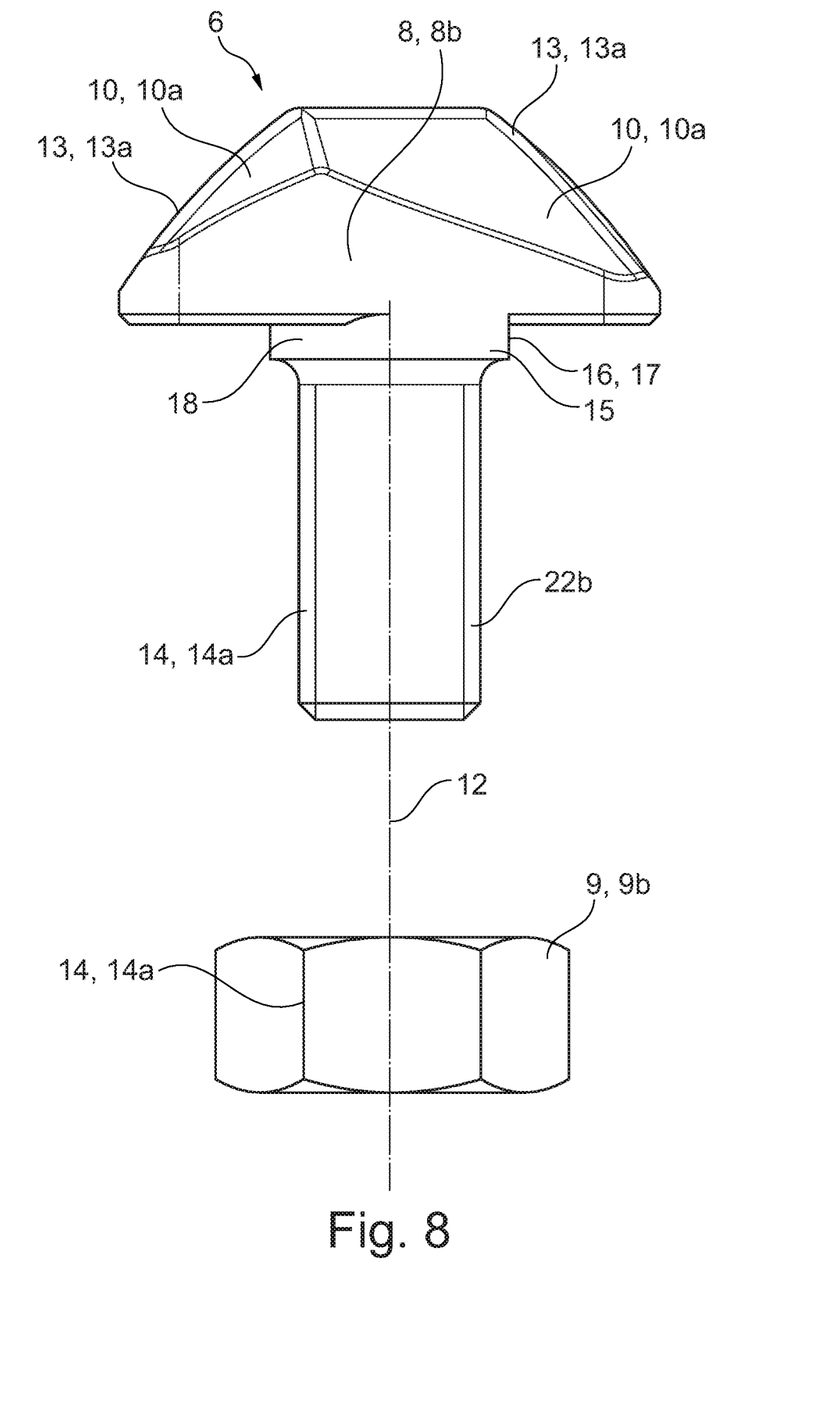
FIG. 8 shows a fastening device according to the invention having a hammer head element which is configured as a hammer head screw, and having a holding element which is configured as a nut, in an exploded illustration.

According to FIGS. 1 to 7, the hammer head element 8 is configured as a hammer head nut 8a which has an internal thread 7, and the holding element 9 is configured as a screw 9a which can be screwed into it, whereas, in the case of the fastening device 6 which is shown according to FIG. 8, the hammer head element 8 is configured as a hammer head screw 8b, and the holding element 9 is configured as a nut 9b which can be screwed onto it. Here, the internal thread 7 penetrates the hammer head nut 8a completely. Here, according to FIGS. 1 to 7, the internal thread 7 is a through opening 4' which runs coaxially with respect to the through opening 4 in the second component 5.

According to FIG. 1, in the case of a fastening device 6 in accordance with the first alternative, the screw 9a is indicated merely in the method step A, and can be a conventional screw with a polygonal tool socket and a metric external thread 22a. Here, on a side which faces the groove 2, the hammer head nut 8a has orienting contours 10 (cf. also FIGS. 3 and 5 to 7) which are configured in such a way that, in the case of the orienting contours 10 being pressed onto the groove 2 or its groove flanks 11 (cf. FIG. 2), they rotate the hammer head nut 8a into an orientation of the hammer head nut 8a with respect to the groove 2 such that it can dip into it independently of a rotary position about its axis 12. This is not possible by way of hammer head screws or hammer head elements which have been known up to now from the prior art, since they always have to be pre-oriented at least in a certain angular range, which represents an additional mounting complexity which is not to be underestimated.

Here, the orienting contours 10 are preferably of steep configuration and enclose, for example, substantially a right angle or a slightly obtuse angle (cf. FIG. 7) with one another, as a result of which comparatively simple rotating of the hammer head nut 8a or the hammer head screw 8b when being pressed onto the groove flanks 11 of the groove 2 and therefore a comparatively simple orientation of the hammer head nut 8a or the hammer head screw 8b parallel to the groove 2 and an introduction thereof into the groove 2 can be achieved.

It is to be noted here in general that the above-described paragraphs and the following descriptions of the figures and FIGS. 1 to 7 always mention a hammer head nut 8a with an internal thread 7, into which a corresponding screw 9a is screwed; it goes without saying that the hammer head nut 8a might also be configured as a hammer head screw 8b with a threaded shank arranged thereon with an external thread 22b, with the result that, in this case, the screw 9a would be configured as a nut 9b, as shown in FIG. 8. The mounting of the fastening device 6 takes place in an analogous manner here.

In order for it to be possible for inexpensive and at the same time high quality production of the hammer head element 8 according to the invention to be achieved, the orienting contours 10 are preferably configured integrally with the hammer head element 8, that is to say with the hammer head nut 8a or the hammer head screw 8b. In addition, the hammer head element 8 is of point-symmetrical configuration with regard to its axis 12, as can be gathered clearly from FIG. 5. Here, the axis 12 of the hammer head element 8 or the hammer head nut 8a/hammer head screw 8b corresponds to the axis 12 of the fastening device 6. The orienting contours 10 of the hammer head nut 8a are of point-symmetrical configuration with respect to the axis 12 of the hammer head nut 8, as is likewise shown according to FIG. 5. A point-symmetrical configuration of this type affords the great advantage that perpendicular placing of the hammer head nut 8a/hammer head screw 8b according to the invention onto the groove 2, independently of a rotary angle position of the hammer head nut 8a/hammer head screw 8b about its axis 12, always leads in the case of subsequently being pressed on to an easy rotation and orientation of the hammer head nut 8a/hammer head screw 8b relative to the groove 2 and therefore also to an easy introduction of the hammer head nut 8a/hammer head screw 8b into the profile groove or the groove 2.

Here, the orienting contours 10 have a plurality of orienting bevels 10a which are likewise oriented in a point-symmetrical manner with respect to the axis 12 and generate the angular momentum which is required for the introduction of the hammer head nut 8a/hammer head screw 8b into the groove 2, the orienting contours 10 or the orienting bevels 10a having a convex shape in the present case, which convex shape additionally assists the rotational operation. As an alternative, it goes without saying that a concave shape of the orienting contours 10 or the orienting bevels 10a is also conceivable.

Figure 3:
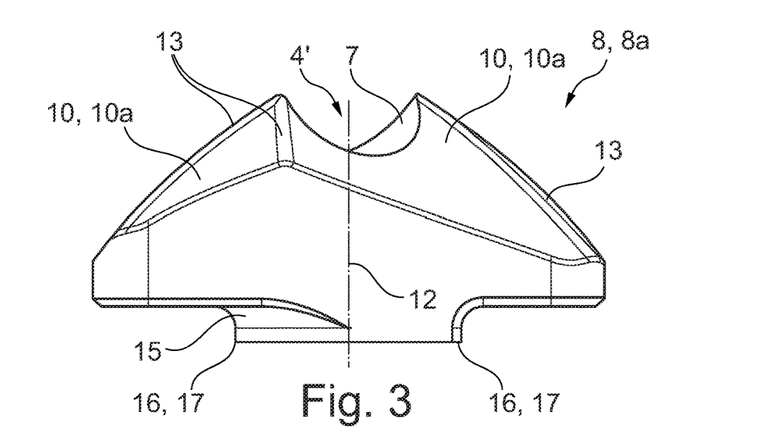
FIG. 3 shows a hammer head nut according to the invention in one view.
Figure 4:
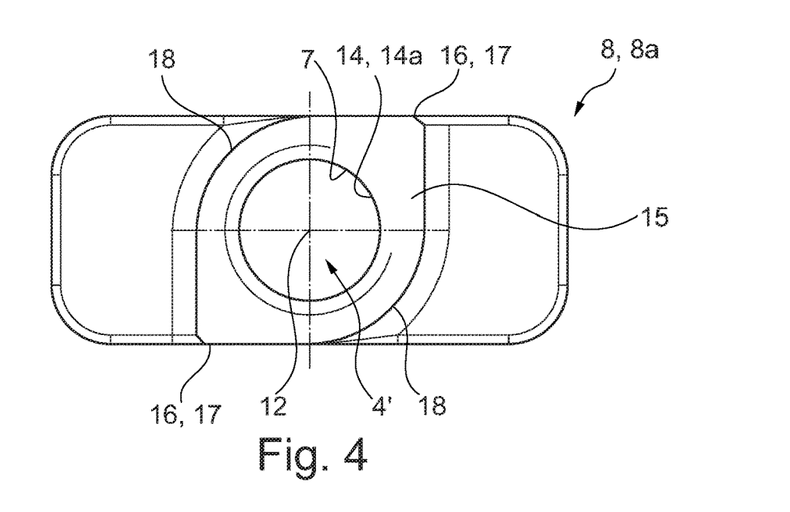
FIG. 4 shows an illustration of the hammer head nut according to the invention from below.
Figure 5:
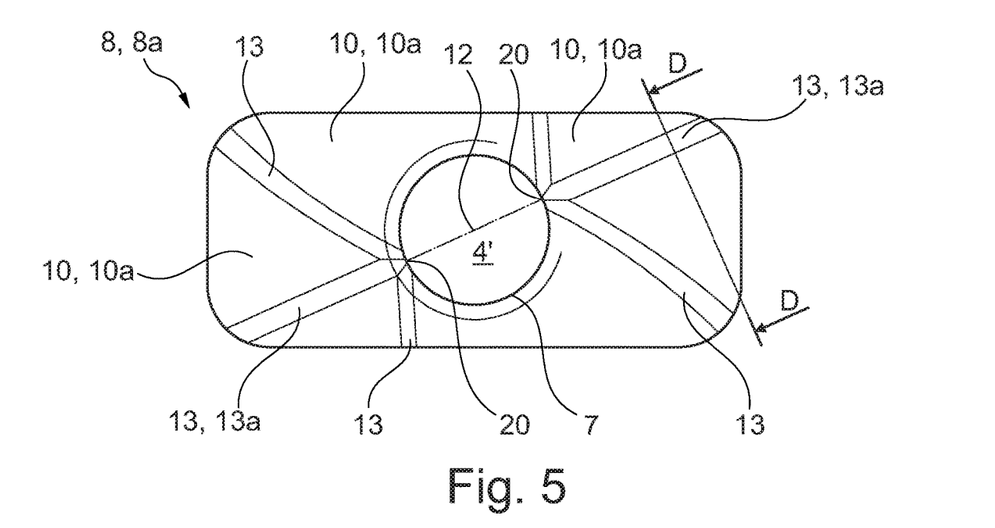
FIG. 5 shows an illustration of the hammer head nut according to the invention from above.

If FIGS. 3 and 5 are considered further, it can be seen that at least two adjacent orienting contours 10 or two adjacent orienting bevels 10a are connected to one another via rounded burrs 13. Here, said rounded burrs 13 prevent tilting, and likewise facilitate the mounting operation of the hammer head element 8, that is to say the hammer head nut 8a/hammer head screw 8b, in the groove 2.

In order for it to be possible, in particular, to reliably prevent even unintended automatic release of the fastening device 6, a friction-increasing layer 14 or structuring 14a which at the same time also brings about driving of the hammer head element 8 in the case of a rotation of the holding element 9 can be provided at indirect or direct contact points between the hammer head element 8, that is to say the hammer head nut 8a/hammer head screw 8b, and the holding element 9, that is to say the screw 9a or the nut 9b. Here, the friction-increasing layer 14 or the structuring 14a which likewise increases the friction can be arranged on the internal thread 7 of the hammer head nut 8a and/or on the external thread 22a of the screw 9a, or on an external thread 22b of the hammer head screw 8b and/or on an internal thread of the nut 9b.

If, moreover, FIGS. 3, 4, 6, 7 and 8 are considered, it can be seen that, on its side which faces away from the orienting contours 10, the hammer head element 8 has an axial projection 15 which, as viewed in an axial view or in the axial direction, has two right-angled corner regions 16 (also called lugs 17 for short) which lie diagonally opposite one another and merge into one another via two arcuate regions 18 which lie opposite one another, the two corner regions 16 (that is to say the two lugs 17) permitting merely a rotation of the hammer head element 8 by 90 degrees in the groove 2 in a mounted state after the hammer head element 8 has dipped completely into the groove 2, and then bearing in a rotationally limiting manner against the corresponding groove flanks 11, as a result of which tightening of the fastening device 6 is made possible by way of tightening of the screw 9a or the nut 9b.

Here, the hammer head element 8 or the holding element 9 can be produced from metal, from plastic or from a combination thereof, as a result of which production is made possible which is not only inexpensive, but rather is also virtually arbitrary with regard to the desired properties. The first component 3 can be configured, for example, as a profiled bar 19 and can be produced, in particular, as an extruded aluminum profile. Here, a cross-sectional shape of the hammer head element 8 corresponds substantially to a clear geometry of the undercut groove 2 in the first component 3, that is to say in the profiled bar 19 in the present case.

Figure 6:
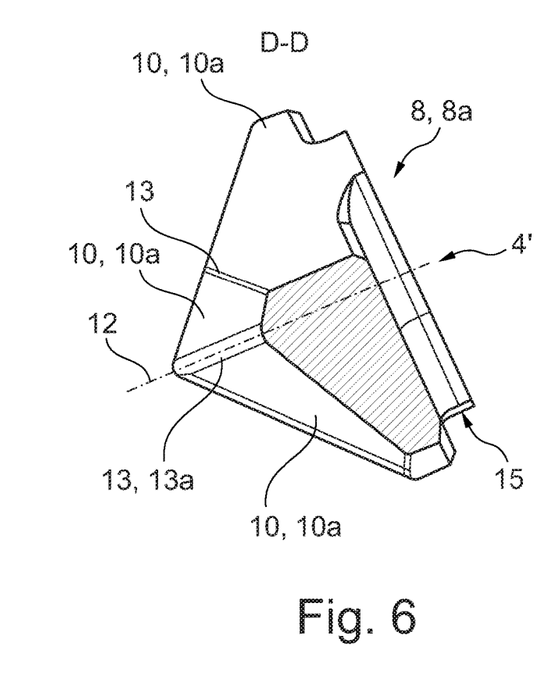
FIG. 6 shows a sectional illustration along the sectional plane D-D.
Figure 7:
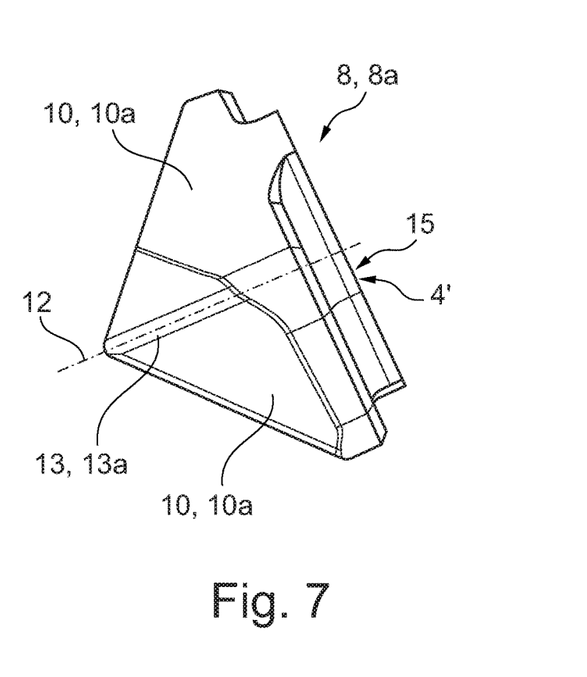
FIG. 7 shows a view of the hammer head nut according to the invention from the perspective A.

If FIGS. 3, 5 and 6 are considered, it can be seen, furthermore, that individual burrs 13 run from the respective corner region of the hammer head nut 8a toward the through opening 4', and in each case three burrs 13 meet one another there at two points 20 which lie opposite one another. Here, two burrs 13a which lie opposite one another lie on a straight line of a diagonal, whereas the two other burrs 13 are of arcuate configuration. As a result, the rotation according to the invention of the hammer head nut 8a can be aided independently of its rotary angle placing position onto the groove 2 or the groove flanks 11. This also applies analogously to a hammer head element 8 which is configured as a hammer head screw 8b.

Here, the burrs 13a intersect the axis 12, whereas the remaining burrs 13 do not intersect the axis 12. Moreover, it can be seen that the individual burrs 13, 13a meet at an edge of the through opening 4' at two points 20 which lie opposite one another in the case of a hammer head element 8 which is configured as a hammer head nut 8a. Here, the two burrs 13a run from the respective corner region of the hammer head element 8 which is configured as a hammer head nut 8a toward the through opening 4'. In the case of a hammer head element 8 which is configured as a hammer head screw 8b, the burrs 13, 13a run analogously, the through opening 4' not being provided, however (cf. FIG. 8).

If FIG. 1a to FIG. 1e are now considered, the individual mounting steps of the fastening arrangement 1 according to the invention are described there in the individual method steps A-E. In method step A, the screw 9a is first of all plugged through the through opening 4 of the second component 5 and is screwed to the hammer head nut 8a by way of a few revolutions. Subsequently, the fastening device 6 together with the second component 5 is moved in the direction of the first component 3 which is to be connected by way of it, the hammer head nut 8a being seated on the groove 2 or its groove flanks 11, as shown in accordance with method step B in FIG. 1.

In method step C, the fastening device 6 is then pressed onto the groove flanks 11, a rotation of the hammer head nut 8a taking place independently of its starting rotary position by way of the orienting contours 10 or the orienting bevels 10a, to be precise until the hammer head nut 8a is oriented with respect to the groove 2 and dips into the latter. Subsequently, a screwdriver 21, for example an Allen key, is connected fixedly to the screw 9a so as to rotate with it, and rotates said screw 9a, whereupon the hammer head nut 8a also rotates in the groove 2. Here, however, the rotation of the hammer head nut 8a is limited to a 90 degree rotation by way of the two lugs 17, since the lugs 17 or the rectangular corner regions 16 then bear against the groove flanks 11 of the groove 2 and prevent a further rotation. This state is shown in method step D in FIGS. 1d and 1n FIG. 2. Subsequently, the screw 9a can be tightened further by way of the screwdriver 21, for example the Allen key, and the fastening device 6 and therefore the fastening arrangement 1 can be tightened.

In the case of the fastening arrangement 1 according to the invention having the hammer head element 8 according to the invention, it is particularly advantageous that said hammer head element 8 can be placed onto the groove 2 independently of its rotary angle position and can be turned simply by way of simple pressing into the groove 2, without it previously being necessary for complicated orientation to take place. As a result, the mounting operation can be simplified considerably.

The invention claimed is:
1. A fastening arrangement, comprising:
    a first component having an undercut groove;
    a second component having a through opening;
    the second component couplable on the first component via a fastening device configured to be guided through the through opening of the second component and engage perpendicularly into the undercut groove;
    the fastening device having an axis oriented perpendicularly to the undercut groove when the fastening device is mounted;

the fastening device including a hammer head element and a holding element couplable to hammer head element via a screwed connection;

wherein the hammer head element and the holding element coupled thereto via the screwed connection are rotatable about the axis in an unrestricted manner when the hammer head element and the holding element are mounted on the second component; and wherein the hammer head element has a plurality of orienting contours disposed on a side facing the undercut groove, the plurality of orienting contours configured such that when the hammer head element is pressed onto the undercut groove the plurality of orienting contours set an orientation of the hammer head element with respect to the undercut groove such that the hammer head element is dippable into the undercut groove independently of a rotary position of the hammer head element about the axis.

2. The fastening arrangement as claimed in claim 1, wherein one of:
the hammer head element is configured as a hammer head nut having an internal thread, and the holding element is configured as a screw screwable into the hammer head nut; and
the hammer head element is configured as a hammer head screw, and the holding element is configured as a nut screwable onto the hammer head screw.

3. The fastening arrangement as claimed in claim 2, wherein:
the hammer head element is configured as the hammer head nut, and the holding element is configured as the screw; and
the internal thread penetrates the hammer head nut completely.

4. The fastening arrangement as claimed in claim 1, wherein the plurality of orienting contours include a plurality of orienting bevels oriented in a point-symmetrical manner with respect to the axis and configured to provide an angular momentum.

5. The fastening arrangement as claimed in claim 4, wherein two adjacent orienting bevels of the plurality of orienting bevels are connected to one another via a plurality of rounded burrs.

6. The fastening arrangement as claimed in claim 5, wherein:
the hammer head element is configured as a hammer head nut; and
the plurality of rounded burrs meet at an edge of the through opening at two opposite points.

7. The fastening arrangement as claimed in claim 6, wherein at least some of the plurality of rounded burrs extend from a respective corner region of the hammer head nut toward the through opening.

8. The fastening arrangement as claimed in claim 1, further comprising at least one of a friction-increasing layer and a structuring configured to facilitate driving of the hammer head element during a rotation of the holding element, wherein the at least one of the friction-increasing layer and the structuring is disposed at least one of (i) at an indirect contact point and (ii) at a direct contact point between the hammer head element and the holding element.

9. The fastening arrangement as claimed in claim 8, wherein one of:
the hammer head element is configured as a hammer head nut having an internal thread, the holding element is configured as a screw screwable into the hammer head nut, and the at least one of the friction-increasing layer and the structuring is disposed at least one of (i) on the internal thread of the hammer head nut and (ii) on an external thread of the screw; and
the hammer head element is configured as a hammer head screw, the holding element is configured as a nut screwable onto the hammer head screw, and the at least one of the friction-increasing layer and the structuring is disposed at least one of (i) on an external thread of the hammer head screw and (ii) on an internal thread of the nut.

10. The fastening arrangement as claimed in claim 1, wherein, on a side facing away from the plurality of orienting contours, the hammer head element includes an axial projection having, as viewed in an axial direction, two right-angled corner regions disposed diagonally opposite one another and that merge into one another via two arcuate regions disposed opposite one another, and wherein the two corner regions bear in a rotationally restricting manner against a corresponding groove flank of the undercut groove when in a mounted state and the hammer head element dips into the undercut groove.

11. The fastening arrangement as claimed in claim 1, wherein at least one of:
at least one of the hammer head element and the holding element is composed of at least one of a metal and a plastic; and
the first component is configured as a profiled bar.

12. The fastening arrangement as claimed in claim 1, wherein the hammer head element is configured as a hammer head nut having an internal thread, and wherein the holding element is configured as a screw screwable into the hammer head nut.

13. The fastening arrangement as claimed in claim 12, further comprising at least one of a friction-increasing layer and a structuring configured to facilitate driving of the hammer head nut during a rotation of the screw, wherein the at least one of the friction-increasing layer and the structuring is disposed at least one of (i) on the internal thread of the hammer head nut and (ii) on an external thread of the screw.

14. The fastening arrangement as claimed in claim 1, wherein the hammer head element is configured as a hammer head screw, and wherein the holding element is configured as a nut screwable onto the hammer head screw.

15. The fastening arrangement as claimed in claim 14, further comprising at least one of a friction-increasing layer and a structuring configured to facilitate driving of the hammer head screw during a rotation of the nut, wherein the at least one of the friction-increasing layer and the structuring is disposed at least one of (i) on an external thread of the hammer head screw and (ii) on an internal thread of the nut.

16. The fastening arrangement as claimed in claim 1, wherein the first component is configured as a profiled bar.

17. A fastening arrangement, comprising:
a first component having an undercut groove;
a second component having a through opening;
the second component couplable on the first component via a fastening device configured to be guided through the through opening of the second component and engage perpendicularly into the undercut groove;
the fastening device having an axis oriented perpendicularly to the undercut groove when the fastening device is mounted;
the fastening device including a hammer head element and a holding element couplable to hammer head element via a screwed connection;
wherein the hammer head element and the holding element coupled thereto via the screwed connection are rotatable about the axis in an unrestricted manner when the hammer head element and the holding element are mounted on the second component;

wherein the hammer head element has a plurality of orienting contours disposed on a side facing the undercut groove, the plurality of orienting contours configured such that when the hammer head element is pressed onto the undercut groove the plurality of orienting contours set an orientation of the hammer head element with respect to the undercut groove such that the hammer head element is dippable into the undercut groove independently of a rotary position of the hammer head element about the axis;

wherein at least one of a friction-increasing layer and a structuring is disposed at least one of (i) at an indirect contact point between the hammer head element and the holding element and (ii) at a direct contact point between the hammer head element and the holding element, the at least one of the friction-increasing layer and the structuring configured to facilitate driving of the hammer head element during a rotation of the holding element; and wherein the plurality of orienting contours include a plurality of orienting bevels oriented in a point-symmetrical manner with respect to the axis and configured to provide an angular momentum.

18. A fastening arrangement, comprising:

a first component having an undercut groove;

a second component having a through opening;

the second component couplable on the first component via a fastening device configured to be guided through the through opening of the second component and engage perpendicularly into the undercut groove;

the fastening device having an axis oriented perpendicularly to the undercut groove when the fastening device is mounted;

the fastening device including a hammer head element and a holding element couplable to hammer head element via a screwed connection;

wherein the hammer head element and the holding element coupled thereto via the screwed connection are rotatable about the axis in an unrestricted manner when the hammer head element and the holding element are mounted on the second component;

wherein the hammer head element has a plurality of orienting contours disposed on a side facing the undercut groove, the plurality of orienting contours configured such that when the hammer head element is pressed onto the undercut groove the plurality of orienting contours set an orientation of the hammer head element with respect to the undercut groove such that the hammer head element is dippable into the undercut groove independently of a rotary position of the hammer head element about the axis; and wherein, on a side facing away from the plurality of orienting contours, the hammer head element includes an axial projection, the axial projection having, as viewed in an axial direction, two right-angled corner regions disposed diagonally opposite one another and two arcuate regions disposed opposite one another, the two right-angled corner regions merging into one another via the two arcuate regions.

19. The fastening arrangement as claimed in claim 18, further comprising a friction-increasing layer configured to facilitate driving of the hammer head element during a rotation of the holding element, wherein the friction-increasing layer is disposed at least one of (i) at an indirect contact point between the hammer head element and the holding element, and (ii) at a direct contact point between the hammer head element and the holding element.

20. The fastening arrangement as claimed in claim 18, further comprising a structuring configured to facilitate driving of the hammer head element during a rotation of the holding element, wherein the structuring is disposed at least one of (i) at an indirect contact point between the hammer head element and the holding element, and (ii) at a direct contact point between the hammer head element and the holding element.

* * * * *